(12) United States Patent
Bauer (10) Patent No.: US 10,807,725 B1
(45) Date of Patent: Oct. 20, 2020

(54) PARACHUTE-FOLDING TOOL AND METHOD TO FACILITATE PLACEMENT OF A PARACHUTE INTO A DEPLOYMENT BAG

(71) Applicant: James Bauer, Philadelphia, PA (US)

(72) Inventor: James Bauer, Philadelphia, PA (US)

( * ) Notice: Subject to any disclaimer, the term of this patent is extended or adjusted under 35 U.S.C. 154(b) by 351 days.

(21) Appl. No.: 16/037,321

(22) Filed: Jul. 17, 2018

Related U.S. Application Data (60) Provisional application No. 62/536,592, filed on Jul. 25, 2017.

(51) Int. Cl.
*B64D 17/76* (2006.01)
*D06F 89/00* (2006.01)
*A41H 43/02* (2006.01)
*B64D 17/40* (2006.01)

(52) U.S. Cl.
CPC ............ *B64D 17/76* (2013.01); *B64D 17/40* (2013.01); *A41H 43/025* (2013.01); *D06F 89/005* (2013.01)

(58) Field of Classification Search
CPC ........ B64D 17/00; B64D 17/52; B64D 17/76; B64D 17/40; D06F 89/005; A41H 43/025
See application file for complete search history.

(56) References Cited

U.S. PATENT DOCUMENTS

| | | | |
|---|---|---|---|
| 1,712,307 A | | 5/1929 | McClintock |
| 2,146,990 A | * | 2/1939 | Rousselot .............. B64D 17/40 244/148 |
| 2,936,138 A | | 5/1960 | Stecel |
| 4,313,291 A | | 2/1982 | Crowell |
| 4,709,818 A | * | 12/1987 | Spinosa ................. B65D 85/07 206/524.8 |
| 6,360,927 B1 | * | 3/2002 | Barker ..................... D06F 89/02 223/37 |
| 8,152,105 B2 | * | 4/2012 | Rossi ..................... B64D 17/40 244/142 |
| 2013/0001261 A1 | * | 1/2013 | Kumar .................... D06F 89/02 223/37 |
| 2014/0158723 A1 | * | 6/2014 | Breier ................... D06F 89/023 223/38 |

\* cited by examiner

*Primary Examiner* — Philip J Bonzell
*Assistant Examiner* — Tye William Abell
(74) *Attorney, Agent, or Firm* — Keeley DeAngelo LLP; W Scott Keeley (57) ABSTRACT

A method and apparatus for facilitating folding and packing of a parachute into a deployment bag is a planar, semi-rigid, horizontally oriented rectangular fabric panel that is seamed or scored to fold at four or more junctures.

13 Claims, 9 Drawing Sheets

PARACHUTE-FOLDING TOOL AND METHOD TO FACILITATE PLACEMENT OF A PARACHUTE INTO A DEPLOYMENT BAG

TECHNICAL FIELD

The present disclosure relates to the folding and packing of parachutes.

BACKGROUND

The sport of parachuting is increasing in popularity due to advancements in safety technologies.

Modern parachutes have one of two types of canopy: ascending or descending. Ascending canopies work with paragliders, which are built to ascend and stay aloft as long as possible. Descending canopies include the ram-air type. This type of canopy is constructed of seven-celled or nine-celled elongate fabric tubes, usually of nylon or other strong, slippery fabric.

Crucial to the correct and safe operation of these canopies is correct deployment. Although deployment depends on numerous factors, the most important is proper packing. A parachute is carefully folded or "packed" to ensure that it will open reliably. If a parachute is not packed properly it can fail to deploy correctly or fully. Approximately one in 1,000 sport main-parachute openings malfunctions, requiring the use of the reserve parachute.

In the present context packing refers to the process of organizing and folding the parachute into a deployment bag which is designed to contain the parachute until the opening sequence commences. A deployment bag ("d-bag") is a fabric pouch roughly the size of a compressed and folded parachute canopy, Folding and packing of a parachute canopy into a d-bag is usually done by hand.

A common procedure for packing modern parachutes is called "proper ram-air orientation" (PRO) packing. Other less-common packing methods include "flat packing" and "psycho-packing." All types of packing involve careful folding of the parachute following an order of operations, with a final folding and compression removing residual air from the canopy) and then placement in a deployment bag. The PRO system ensures proper packing and a tight fit into the deployment bag.

Following PRO packing, a parachute canopy is "S-folded" and compressed by the weight of one's arms and legs to contain and help compress the canopy and insert it into the deployment bag. Because canopy fabric is bulky and slippery and because residual air remains in the canopy's folds, this step can be laborious; the canopy's folds often slide about and impede packing. The result is a sloppy pack job and frustration, especially for beginning skydivers who use large parachutes.

In some products, the construction of hinged planar material is achieved with living hinges in plastic materials. Plastic living hinges are typically manufactured in an injection-molding operation that creates a first surface, a hinge and a second surface with the first and second surfaces hingedly engaged. Polyethylene and polypropylene are considered appropriate resins for producing living hinges, due to their fatigue-resistance properties.

SUMMARY

The present embodiment relates to a method and tool that facilitates folding and compressing a parachute for proper placement in a deployment bag.

In an example embodiment a planar, semi-rigid, horizontally oriented rectangular fabric panel is seamed or scored to fold at four junctures. The panel's center segment is sized approximately of the length and width of a PRO-folded parachute canopy. Two middle segments (those that flank the center segment) are each approximately half the width as the center segment. Adjacent to the middle segments, outer segments approximate the width of the center segment. In all, this example embodiment comprises five segments.

In another example iteration a planar, semi-rigid, horizontally oriented rectangular fabric panel is seamed or scored to fold at six junctures. The panel's center segment is sized approximately of the length and width of a PRO-folded parachute canopy. Two middle segments (those that flank the center segment) are each approximately half the width of the center segment. Adjacent to the middle segments, additional outer segments approximate the width of the middle segments. In all, this example embodiment comprises seven segments.

One skilled in the art understands that these dimensions may vary without departing from the scope of the invention. Although an example embodiment is substantially rectangular, one skilled in the art understands that variations in the form may be made without departing from the scope of the invention. One skilled in the art also understands that the rigidity or flexibility of the form may vary. In some embodiments the center portion is more rigid than the outer portions and the outer portions may be flexible fabric.

The embodiment is meant to facilitate proper compression and folding of a parachute canopy into a deployment bag. Once the parachute canopy is packed the device can be easily removed without being caught on the parachute, deployment bag, parachute lines or other part of the parachute rig. In other words, the device is smaller than the deployment bag when packed about a parachute and is designed to pack the parachute in the deployment bag and be easily removed.

In use, in example embodiment 1, the parachute-folding tool is placed horizontally over the pre-folded canopy. Following PRO-folding procedure, the packer makes an initial fold in the canopy (the first fold of an "S" fold), using the top edge of the parachute-folding tool to define the edge of that fold. A second fold is made inward atop the center segment of the tool (representing the second fold of an "S" fold). The canopy is then rolled and compressed further by hand until trapped air is removed. Then the outermost segments of the parachute-folding tool are drawn in and folded, one overlapping the other, over the folded parachute canopy, to form a box-like enclosure tightly containing the pre-folded canopy. The whole folded ensemble is then packed into the d-bag. To do this, the packer uses one hand to hold the two outermost segments of the tool in place over the contained canopy. Using the other hand, the packer then places the parachute and device into the deployment bag.

After placement into the deployment bag, the device, no longer needed, is slid out from the packed canopy and d-bag ensemble. The canopy is left neatly folded in the deployment bag. Other objects and features will become apparent from the following detailed description considered together with the accompanying drawings. These drawings are designed to illustrate, not limit, the invention.

BRIEF DESCRIPTION OF THE DRAWINGS

To assist those of skill in the art of making and using the disclosed anatomical reference guide, reference is made to the accompanying figures, wherein.

DESCRIPTION

Figure 1:
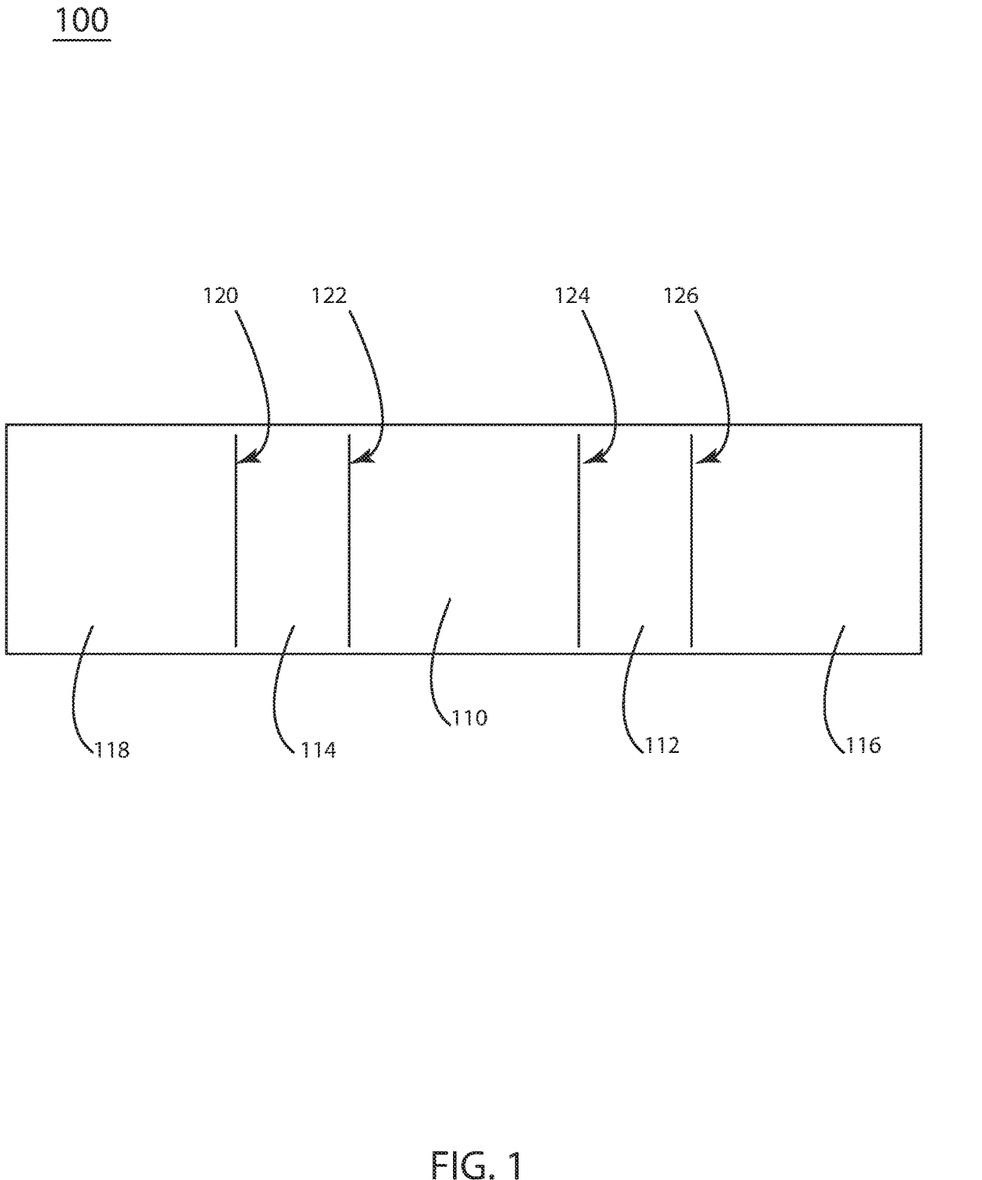
FIG. 1 is a front view of the embodiment.

In FIG. 1 an example embodiment 100 shows its five segments 110, 112, 114, 116 and 118, which fold at hinges or seams 120, 122, 124 and 126. Hinges/seams fold in a forward or backward direction.

Figure 2:
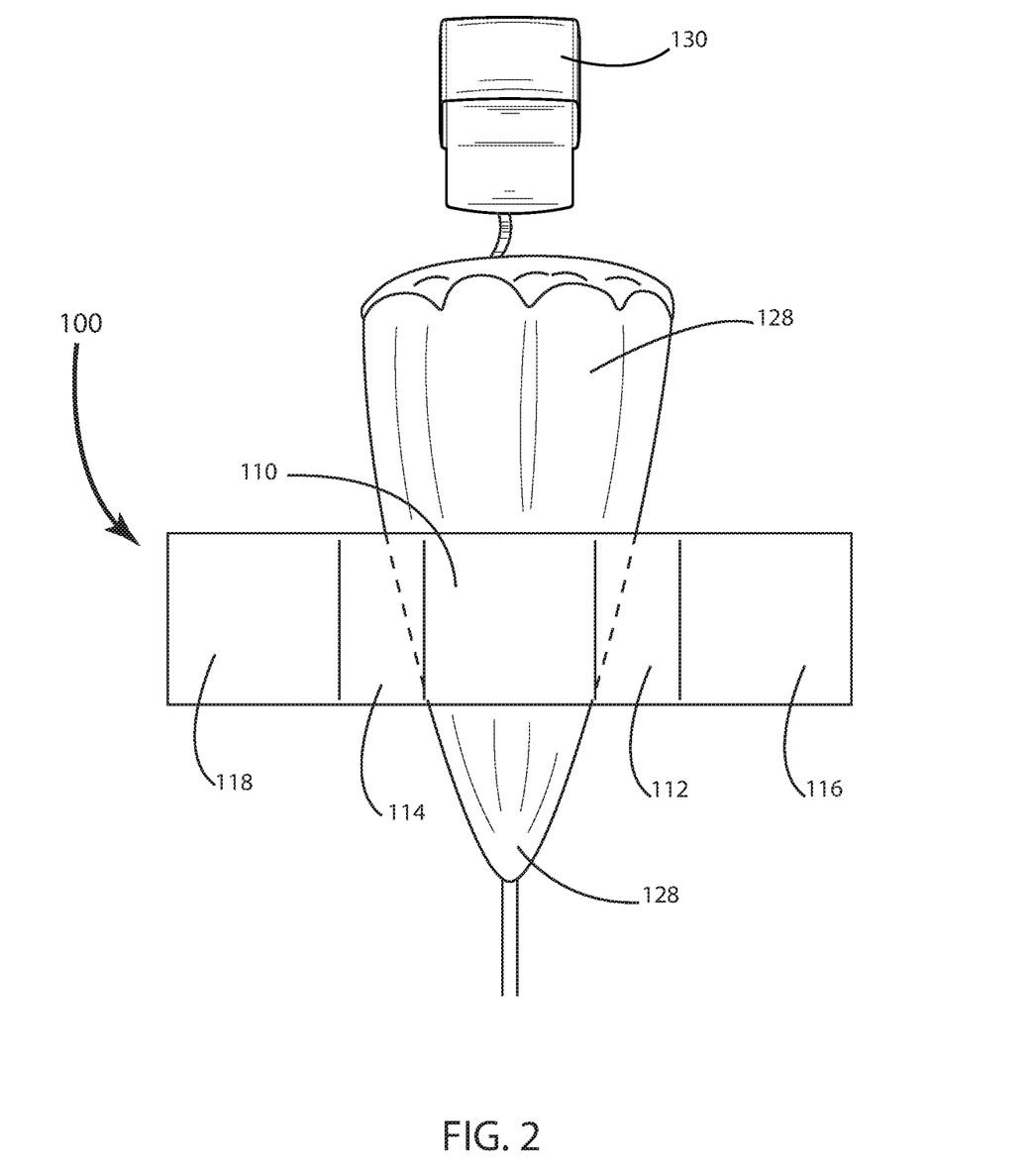
FIG. 2 is a front view of the embodiment shown placed atop a folded canopy, ready to assist in folding the canopy.

FIG. 2, 100 shows a provided, a folded parachute canopy 128, with the parachute-folding tool 100 placed atop it and ready to begin folding. The five segments 110, 112, 114, 116 and 118 are shown for reference. The d-bag 130 is shown for reference.

Figure 3:
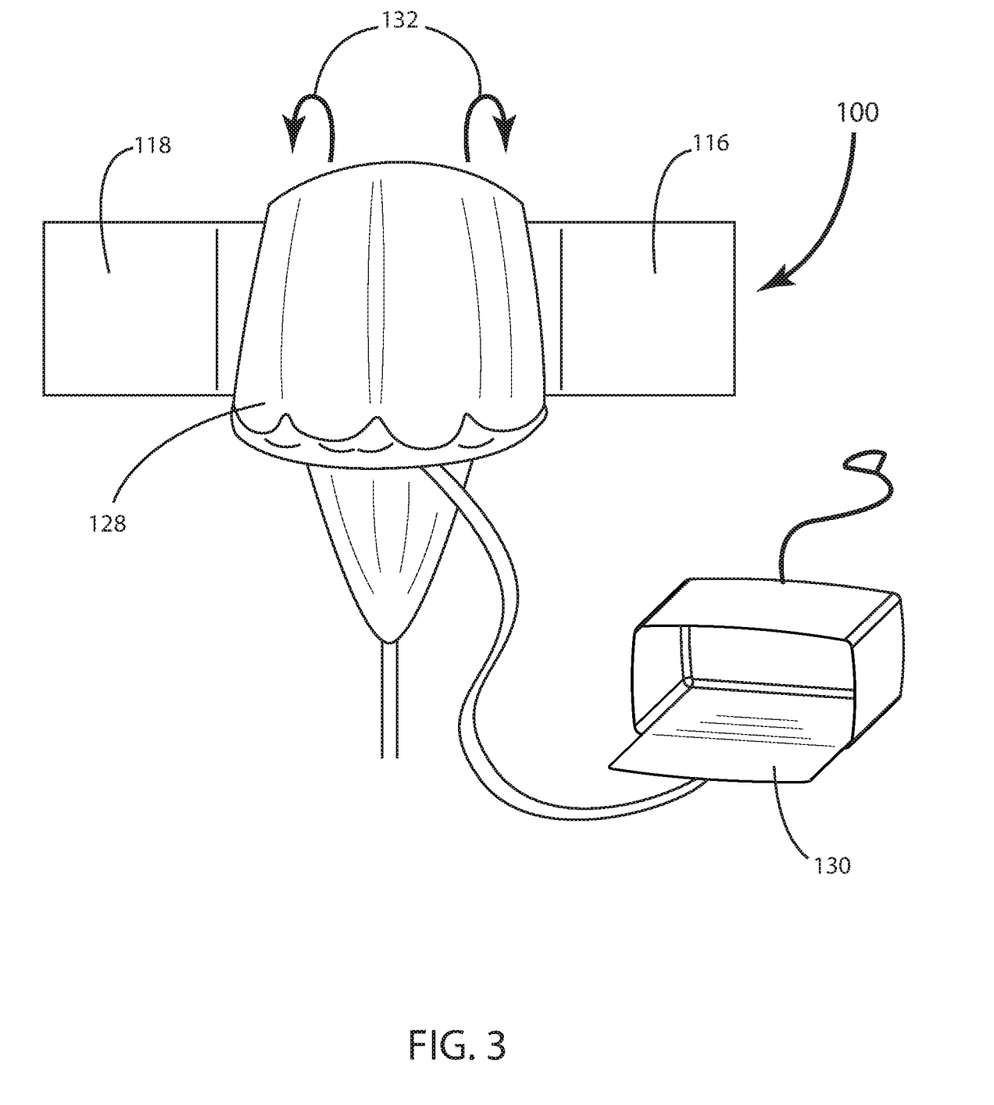
FIG. 3 is a front, perspective view of the embodiment shown in use beneath a parachute canopy.

In FIG. 3 the top of the folded parachute 128 is folded 132 over the parachute-folding tool 100, using the tool's edge to facilitate folding. This is the first fold of an "S-fold." Segments 116 and 118 are shown for reference.

Figure 4:
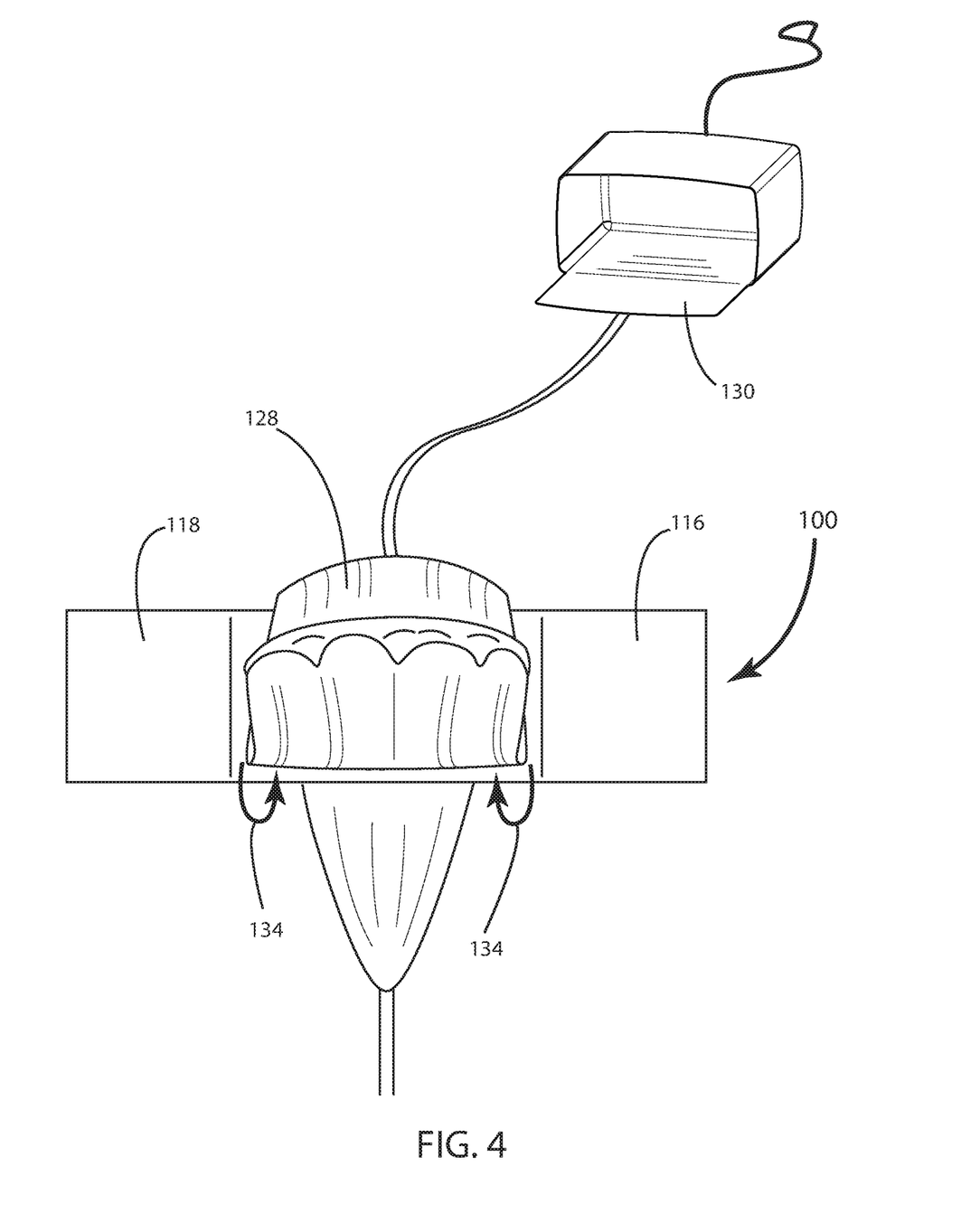
FIG. 4 is a front, perspective view of the embodiment in use beneath a parachute canopy that has been folded.

In FIG. 4, the parachute canopy 128 is folded back on itself (as demonstrated by arrows 134), completing the "S-fold" The tool 100 remains stationary. The d-bag 130 is shown for reference. Segments 116 and 118 are shown for reference.

Figure 5:
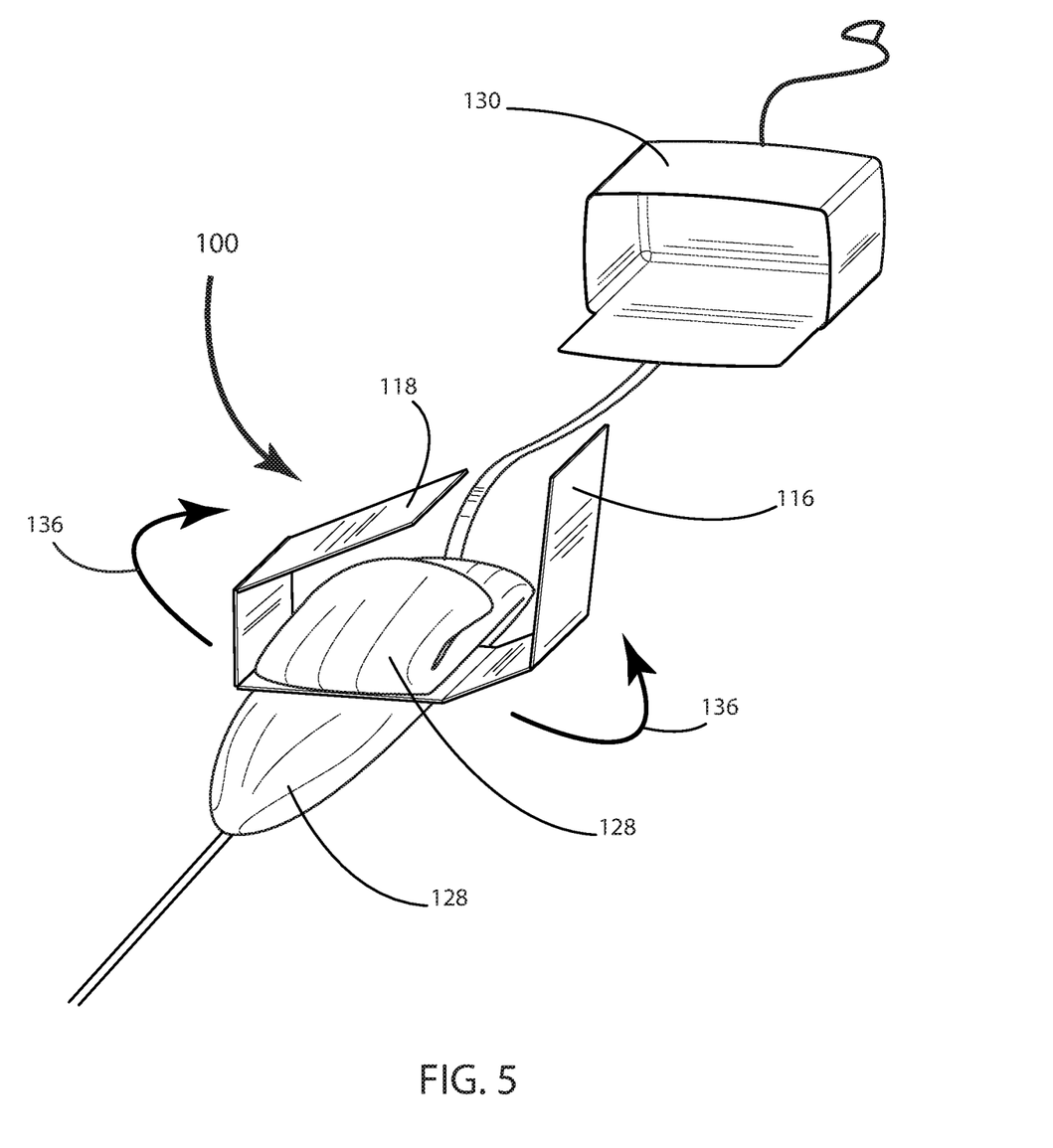
FIG. 5 is a front, perspective view of the embodiment in use as it is folded upon the parachute canopy.

In FIG. 5, The outer segments 116, 118 of the parachute-folding tool 100 are folded 136 inward around the parachute canopy 128. The d-bag 130 is shown for reference.

Figure 6:
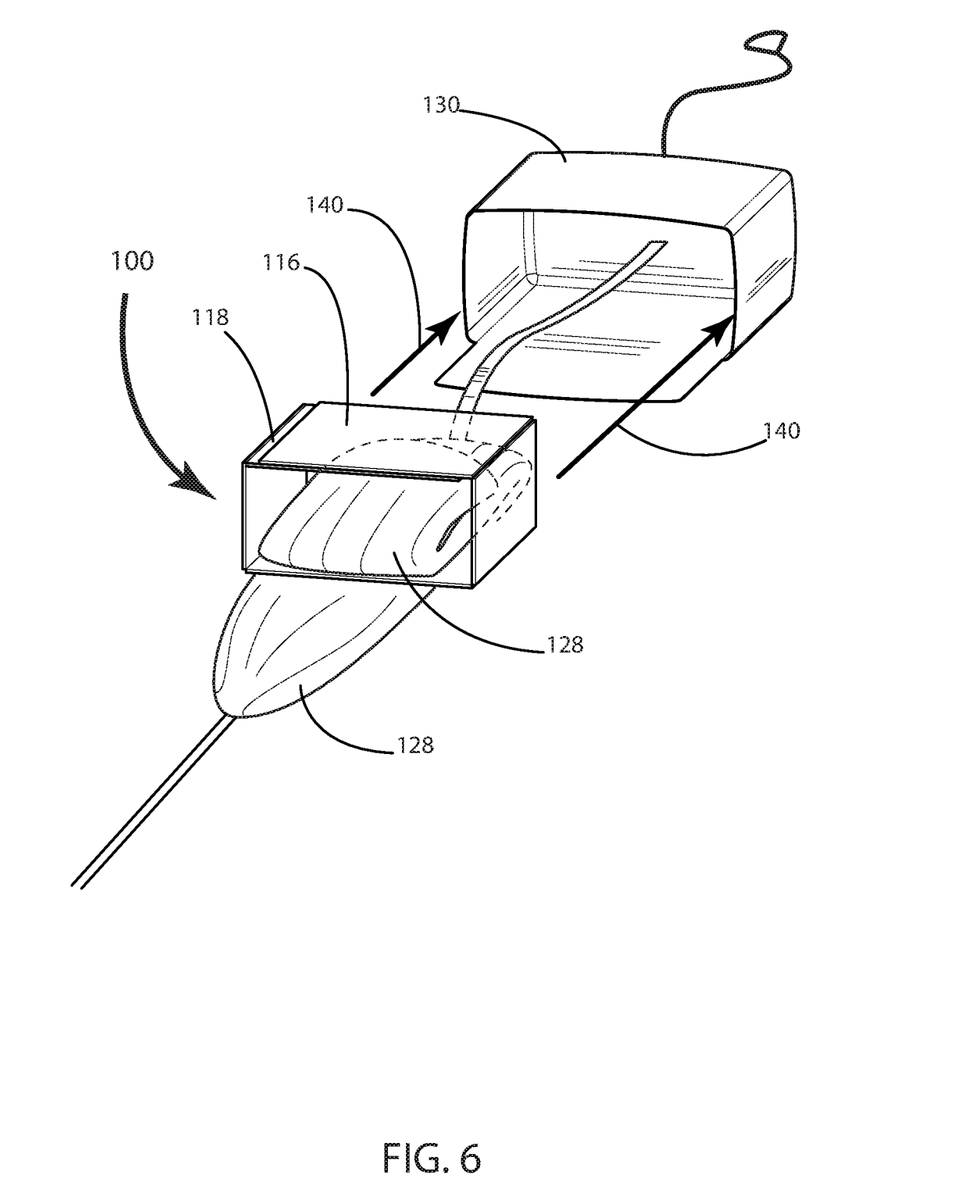
FIG. 6 is a front, perspective view of the embodiment in use, folded around the parachute canopy and being inserted into a d-bag.

In FIG. 6, the outer segments 116, 118 of the parachute-folding tool 100 have been folded. The parachute-folding tool 100 is completely folded about the parachute canopy 128 and is ready to insert 140 into the d-bag 130.

Figure 7:
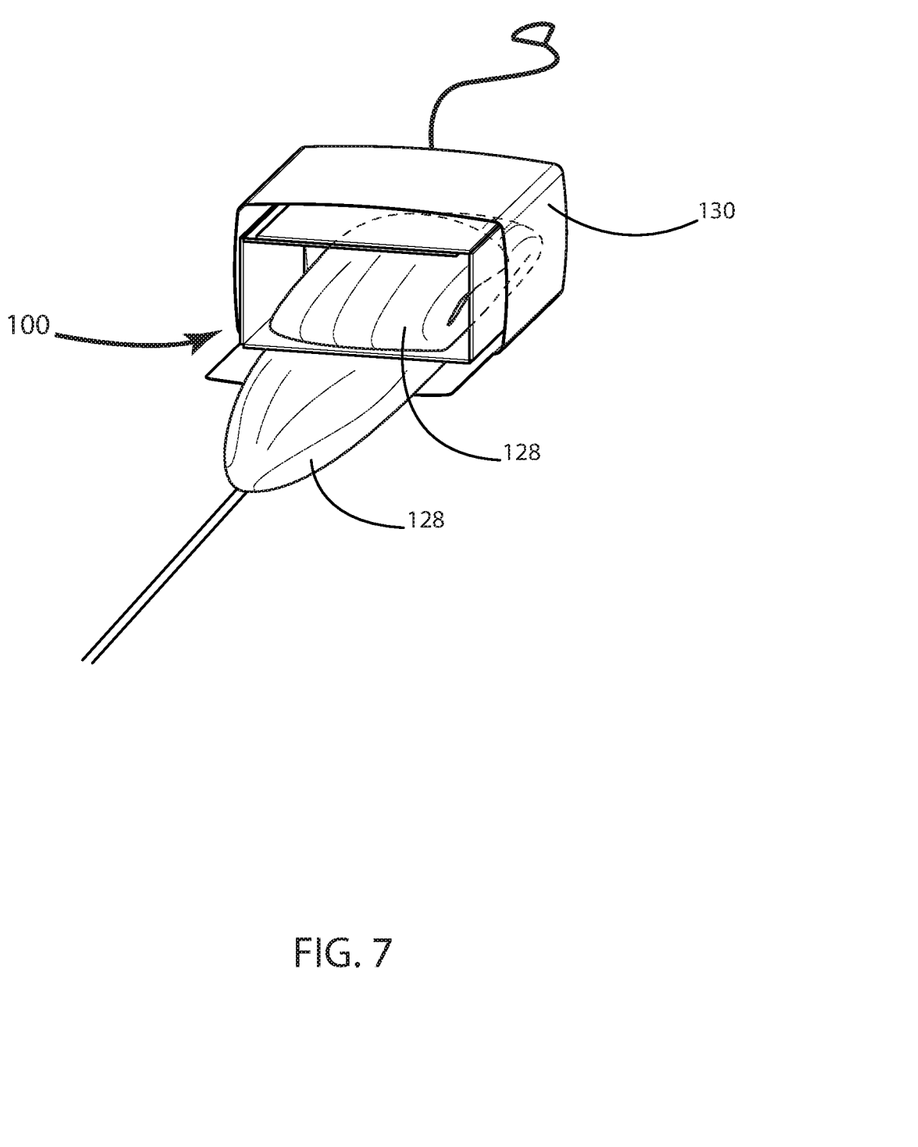
FIG. 7 is a front, perspective view of the embodiment inserted into the d-bag.

In FIG. 7 the folded parachute canopy 128, contained in the parachute-folding tool 100, is shown inserted into the d-bag 130.

Figure 8:
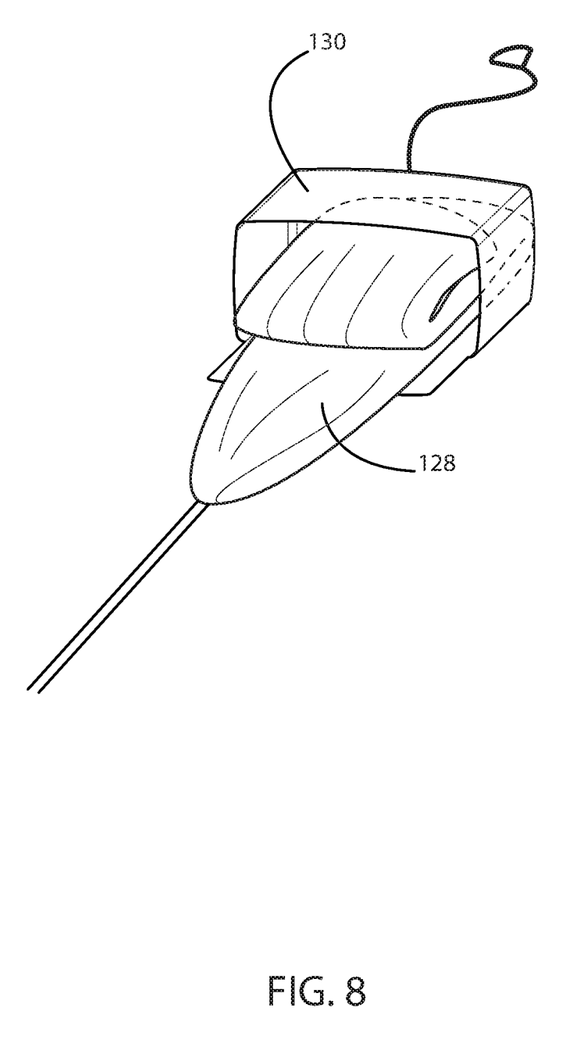
FIG. 8 is a front, perspective view depicting the embodiment having achieved its use and removed from the the d-bag.

FIG. 8, the parachute-folding tool, having achieved its use, has been removed from the d-bag 130, leaving the parachute canopy 128 folded within.

Figure 9:
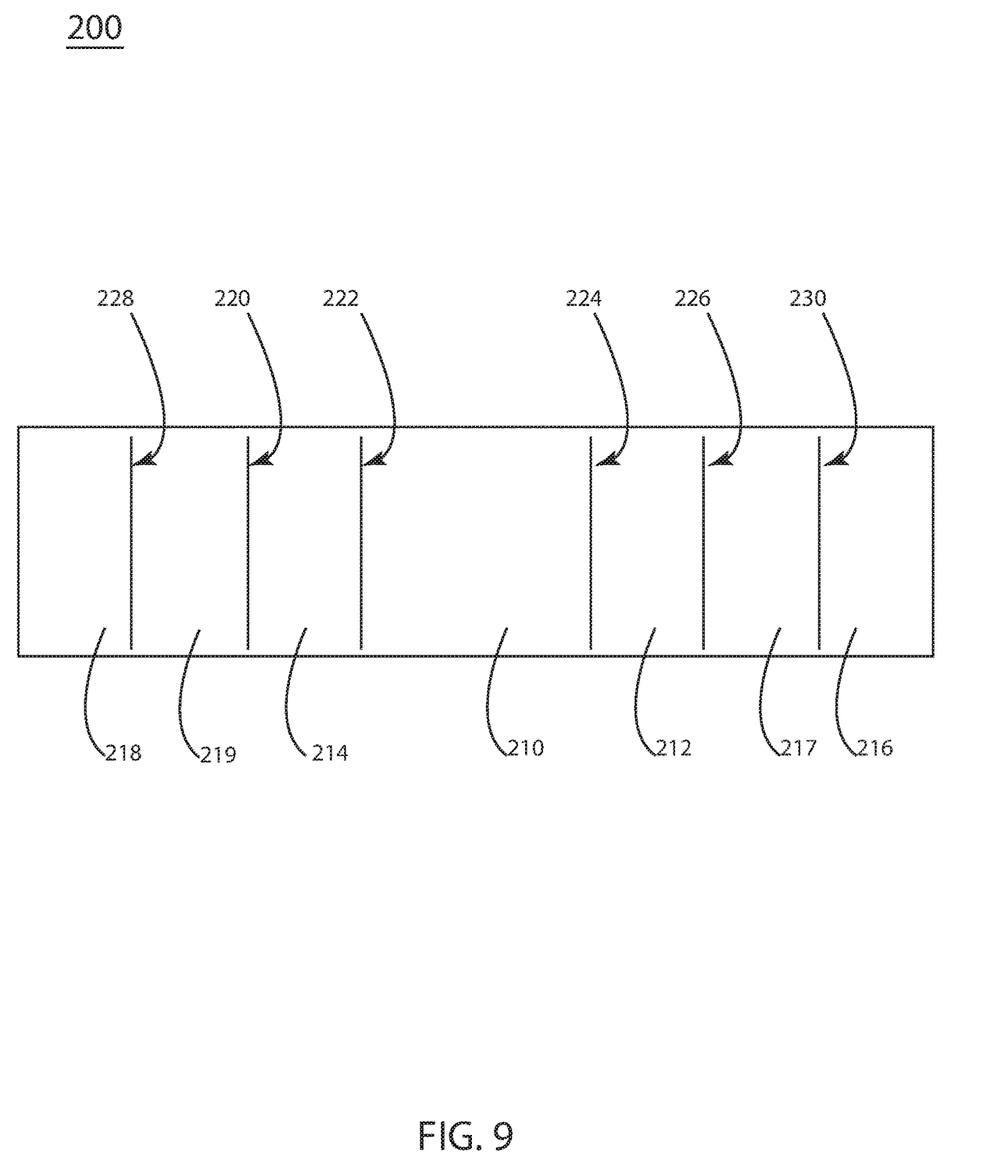
FIG. 9 is a front view of an iteration of the embodiment.

In FIG. 9 an iteration of the embodiment 200 shows its seven segments 210, 212, 214, 216, 218, 217 and 219 which fold at hinges or seams 220, 222, 224, 226, 228 and 230. Hinges/seams fold in a forward or backward direction. Seams 228 and 230 allow the entire apparatus to fold to the size of the center segment for packing the embodiment flat. One skilled in the art understands that folding at seams 222 and 224, and again at 228 and 230 in the opposite direction would fold the apparatus to the size of the center segment for packing the embodiment flat.

The example embodiments described herein should not be construed as limiting.

The invention claimed is:

1. An apparatus for folding a parachute comprising:
   a substantially rigid, rectangular center surface having a top, bottom, left and right edge; and
   a first rectangular middle surface; and
   a second rectangular middle surface; and
   the left edge of the rectangular center surface hingedly engaged with a long edge of the first rectangular middle surface; and
   the right edge of the rectangular center surface hingedly engaged with a long edge of the second rectangular middle surface; and
   a first rectangular outer surface; and
   a second rectangular outer surface; and
   the first rectangular outer surface hingedly engaged along one long edge with a long edge of the first rectangular middle surface; and
   the second rectangular outer surface hingedly engaged along one long edge with a long edge of the second rectangular mid-surface; wherein
   the apparatus engages with a parachute to aid in folding the parachute into an S-fold for properly inserting into a deployment bag.

2. The apparatus of claim one wherein all rectangular surfaces are of substantially the same height.

3. The apparatus of claim one wherein the first rectangular middle surface and the second rectangular middle surface are of a width that is half of said rectangular center surface.

4. The apparatus of claim one wherein the first rectangular mid-surface and the second rectangular middle surface are of a width that is half of said rectangular center surface; and
   the first rectangular outer surface and the second rectangular outer surface are substantially identical in dimension to the rectangular center surface.

5. The apparatus of claim one wherein the surfaces are made of fabric covered, die-cut plastic.

6. The apparatus of claim one wherein the surfaces are made of one contiguous piece of plastic material with living hinges between rectangular, hingedly engaged segments.

7. The apparatus of claim one wherein the surfaces are made of one contiguous piece of molded foam material with living hinges between rectangular, hingedly engaged segments.

8. An apparatus for folding a parachute comprising:
   a substantially rigid, rectangular center surface having a top, bottom, left and right edge; and
   a first rectangular middle surface; and
   a second rectangular middle surface; and
   the left edge of the rectangular center surface hingedly engaged with a long edge of the first rectangular middle surface; and
   the right edge of the rectangular center surface hingedly engaged with a long edge of the second rectangular middle surface; and
   a first rectangular outer surface; and
   a second rectangular outer surface; and
   the first rectangular outer surface hingedly engaged along one long edge with a long edge of the first rectangular middle surface; and
   the second rectangular outer surface hingedly engaged along one long edge with the remaining un-engaged long edge of the second rectangular middle surface; and
   a first rectangular terminal surface; and
   a second rectangular terminal surface; and
   the first rectangular terminal surface hingedly engaged along one long edge with a long edge of the first rectangular outer surface; and the second rectangular terminal surface hingedly engaged along one long edge with the remaining un-engaged long edge of the second rectangular outer-surface; wherein the apparatus engages with a parachute to aid in folding the parachute into an "S"-fold for properly inserting into a deployment bag.

9. The apparatus of claim eight wherein all rectangular surfaces are of substantially the same height.

10. The apparatus of claim eight wherein the first rectangular mid-surface and the second rectangular middle surface are of a width that is half of said rectangular center surface.

11. The apparatus of claim eight wherein the first rectangular middle surface and the second rectangular middle surface are of a width that is half of said rectangular center surface; and the first rectangular outer surface and the second rectangular outer surface are of a width that is half of said rectangular center surface.

12. The apparatus of claim eight wherein the first rectangular middle surface and the second rectangular middle surface are of a width that is half of said rectangular center surface; and the first rectangular outer surface and the second rectangular outer surface are of a width that is half of said rectangular center surface; and the first rectangular terminal surface and the second rectangular terminal surface are of a width that is half of said rectangular center surface.

13. A method for packing a parachute, the method comprising:

placing a parachute on a flat surface; and folding the parachute into an elongate triangle; and placing a segmented template over the folded parachute; and folding the parachute over a center segment of the template; and folding the parachute again in the opposite direction of the fold over the center segment; and surrounding the folded parachute on three sides with remaining segments of segmented template; and placing the folded, surrounded parachute and template combination in a parachute deployment bag; and removing the template from the deployment bag; and packing the remaining portions of the parachute into the deployment bag.

\* \* \* \* \*